United States Patent Office 3,349,058
Patented Oct. 24, 1967

3,349,058
ORGANIC PHOSPHITES FOR PREVENTION OF VOID FORMATION IN POLYMER OLEFIN STRUCTURES
Kenneth R. Mills and Arthur A. Harban, Bartlesville, Okla., assignors to Phillips Petroleum Company, a corporation of Delaware
No Drawing. Filed Mar. 18, 1963, Ser. No. 266,012
9 Claims. (Cl. 260—45.85)

This invention relates to a method for the prevention of void formation in mono-olefin polymer structures. In another aspect the invention relates to a method for the treatment of mono-olefin polymers which have been treated with a diketone.

Various reactions for the polymerization of olefins have been described in the literature and the polymerizations are usually carried out in the presence of a catalyst or an initiator system. One type of catalyst which has been widely employed in the polymerization of mono-olefins consists of an organo compound such as triethylaluminum or diethylaluminum chloride and a compound of a heavy metal, for example, titanium trichloride. A presently employed procedure for preparing polymers such as polypropylene involves the polymerization of propylene with a catalyst system comprising an alkyl aluminum compound and the reaction product of aluminum and titanium tetrachloride in a mass system wherein the propylene is in liquid phase and the polymerization is conducted in the substantial absence of a diluent other than the monomer itself. One of the problems encountered with polymers prepared in this manner concerns the presence in the product of catalyst residues or ash forming ingredients. The ash content of a polymer product refers to the inorganic constituents which are present in the polymer in unidentified form and which produce ash when the polymer is burned. The presence of these catalyst residues and ash forming ingredients in the polymer adversely affects the color and stability of the polymer as well as its electrical properties.

A number of methods have been proposed for the removal of the catalyst residues from the polymer including the treatment of the resultant polymer with a suitable extractant such as the diketones, particularly α-diketones and β-diketones. While metallic residues are removed effectively and economically by this operation it has been found that films fabricated from the treated polymer by extrusion at a temperature above about 400 to 600° F. may contain numerous minute voids or bubbles. Such voids occur in streaks or patches reducing the transparency of the film and rendering it generally undesirable for many uses. The cause of such void formation or streaking is not fully understood but is believed to result from the diketone treatment since films from polymers not so treated do not shown such defects.

It is an object of the invention to prepare a mono-olefin polymer structure.

It is another object of the invention to prevent the formation of voids in films or filament prepared from a polymer of a mono-olefin.

Yet another object of the invention is to treat a polymer of a mono-olefin containing a diketone.

These and other objects of the invention will be readily apparent to those skilled in the art from the accompanying disclosure and appended claims.

These objects are broadly accomplished in a process for the preparation of a substantially void-free structure from a polymer of a 1-olefin which has been treated with a diketone by the process comprising contacting said polymer with a phosphite ester represented by the structural formula

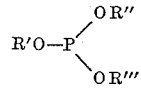

where R' is a hydrocarbon group selected from the group consisting of alkyl, aryl, cycloalkyl, alkaryl and aralkyl groups having 1 to 20 carbon atoms and R" and R''' are selected from the group consisting of R' and H and extruding said polymer at a temperature above its softening point to form a structure, e.g., a film or filament.

In one aspect of the invention, the polymer is also treated with a phenolic antioxidant prior to extrusion.

Typical examples of such phosphites include: isobutyl phosphite, ethyl phosphite, cyclohexyl phosphite, phenyl phosphite, tridecyl phosphite, eicosyl phosphite, 1-naphthyl phosphite, 2-phenanthryl phosphite, 1-(3,5,7-triethylanthrycyl) phosphite, di(2-phenylethyl) phosphite, di(hexadecyl) phosphite, dicyclopentyl phosphite, dioctyl phosphite, diethyl phosphite, di(tridecyl) phosphite, dibutyl phosphite, diphenyl phosphite, didecyl phosphite, cyclohexyldecylphenyl phosphite, trioctyl phosphite, trimethyl phosphite, triethyl phosphite, tributyl phosphite, triisobutyl phosphite, tri(sec-butyl) phosphite, tri(tert-butyl) phosphite, trihexyl phosphite, tricyclohexyl phosphite, tri(2-ethylhexyl) phosphite, triisooctyl phosphite, tri(tridecyl) phosphite, tri(heptadecyl) phosphite, tri(octadecyl) phosphite, trieicosyl phosphite, phenyldidecyl phosphite, phenyldi(hexadecyl) phosphite, phenyldi(nonadecyl) phosphite, diphenyldecyl phosphite, diphenylheptadecyl phosphite, diphenylnonadecyl phosphite, triphenyl phosphite, tri(p-octylphenyl) phosphite, tri(1-naphthyl) phosphite, tri(2-naphthyl) phosphite, tri(p-dodecylphenyl) phosphite and the like.

Particularly suitable phosphites are di- or trioctyl phosphite, diethyl phosphite, dibutyl phosphite, diphenyl phosphite and di- or tridecyl phosphite. Of these dioctyl phosphite is presently preferred.

These organic phosphites are employable in any amount which is sufficient to reduce the void formation of the polymer upon subsequent extrusion. A generally preferred amount is in the range of 0.025 to 1.0, preferably 0.05 to 0.2, parts by weight per 100 parts of polymer.

The organic phosphite may be added to the polymer at any time subsequent to the treatment of the polymer with the diketone and prior to extrusion of the polymer through the die to form the film or filament. This addition may be accomplished by any suitable method such as Banbury mixing or roll milling of the polymer with the phosphite. A particularly preferred method is to dissolve the phosphite ester in low-boiling alcohols, ethers, aldehydes and ketones, such as methanol, ethanol, propanol, ethyl ether, n-propyl ether, isopropyl ether, ethyl n-propyl ether, tetrahydrofuran, acetaldehyde, propionaldehyde, isobutryaldehyde, acetone, methyl ethyl ketone, and the like and apply the solution to a particulate form of polymer. This is conveniently accomplished by simply spraying this solution on the polymer prior to its being charged to the extruder. After addition of the phosphite, the polymer can be extruded directly into the film or filament or the like or it may be pelletized for shipment or storage for subsequent extrusion.

It is also within the scope of the invention to admix the polymer with suitable plasticizing agents, dyes, fillers, pigments, and the like.

It is often convenient to dissolve an antioxidant either alone or together with a synergistic additive therefor, such as dilaurylthiodipropionate and to apply these agents simultaneously with the phosphite ester to particulate polymer or to apply the phosphite ester first followed by the antioxidant. Any suitable antioxidant may be employed but particularly desirable are the phenolic antioxidants. A number of these phenolic antioxidants are available commercially. Particularly preferable phenolic antioxidants are of the type: 4,4'-thiobis(3-alkyl-6-tertiary alkylphenol) and N-acyl-p-aminophenol, and also 2,6-di-tertiary-butyl-4-methylphenol, 2,2 - methylene bis-(5--isopropylphenol) and 2,2 - methylene bis(4-methyl-6-tert-butylphenol); good results generally are also found with, for example, diorthocresylolpropane; 2,4-dimethyl-6-tertiary-butylphenol; bis-(2-hydroxy-3,5-dialkylphenol)-alkanes and the similar 3-cycloalkyl- and 3(alkyl-substituted cycloalkyl)-compounds, especially bis-(2-hydroxy-3-tertiary-butyl-5-methylphenyl)-methane and bis-(2-hydroxy 3-alpha-methylcyclohexyl-5-methylphenyl) - methane. Special examples of the preferably used phenolic compounds are: 4,4'-thiobis(3-methyl-6-tert-butylphenol), N-stearyl-p-aminophenol, 2,6 - di-t-butyl-4-methylphenol and N-lauryl-p-aminophenol. Of these presently preferred is 2,6-di-t-butyl-4-methylphenol, particularly in combination with dilaurylthiodipropionate. These additives or antioxidants may be added in roughly equivalent amounts with the phosphite ester.

The invention is broadly applicable to the treatment of normally solid polymers of olefins including homopolymers and copolymers of 1-olefins and particularly those 1-olefins wherein the monomer contains from 2 to 8 carbon atoms. The invention is particularly applicable to the treatment of polymers which were prepared by polymerizing at least one mono-1-olefin containing at least 3 carbon atoms, preferably not more than 6 carbon atoms. Examples of suitable monomers include ethylene, propylene, 1-butene, 1-pentene, 3-methyl-1-butene, 1-hexene, 4-methyl-1-pentene, and the like. The expression "polymers" employed herein refers to both homopolymers and copolymers of the olefins with each other and with other copolymerizable monomers, such as diolefins including 1,3-butadiene, 1,4-pentadiene, 3-methyl-1,3-butadiene, and 1,3-pentadiene. Although the invention is not so limited, the discussion is simplified by primary reference to propylene.

The invention is not limited to the method of preparation of the polymer nor to the catalyst system employed but it is generally applicable to those systems requiring the employment of a diketone for the removal of catalyst residue so as to improve the color and stability and electrical properties of the polymer product. These diketones can be defined as being selected from the group consisting of the group of compounds containing the group:

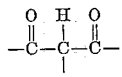

Such materials are those selected from the group consisting of (a) compounds of the general formula:

(a) 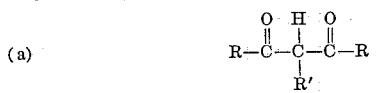

and (b) compounds of the general formula:

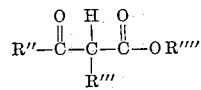

In compound (a) each R can be an alkyl, cycloalkyl, aryl, aralkyl, alkaryl, alkylcycloalkyl, or cycloalkylalkyl group or the R's can be joined to form a cyclic structure and R' can be hydrogen or an alkyl, cycloalkyl, aryl, alkaryl, aralkyl, alkylcycloalkyl, cycloalkylalkyl group, the number of carbon atoms in each R and R' being from 1 to 8.

In compound (b) R" is an alkyl, cycloalkyl, aryl, aralkyl, alkaryl, alkylcycloalkyl, cycloalkylalkyl group or an OR"" group; R"' is hydrogen or a hydrocarbon group as defined for R"; and R"" is a hydrocarbon group as defined for R", the number of carbon atoms in R", R"', and R"" being from 1 to 8.

Typical of such compounds are 2,4-pentanedione (acetylacetone), 2,4 - hexanedione, 2,4 - heptanedione, 5-methyl-2,4-hexanedione, 2,4-octanedione, 5,5-dimethyl-2,4-hexanedione, 3-ethyl-2,4-pentanedione, 2,2-dimethyl-3,5-nonanedione, 1-cyclohexyl-1,3-butanedione, 5,5-dimethyl-1,3-cyclohexanedione, 1-phenyl-1,3-butanedione, 1-(4-biphenylyl)-1,3-butanedione, 1-phenyl-1,3-pentanedione, 1-phenyl-5,5-dimethyl-2,4-hexanedione, 1,3-diphenyl-1,3-propanedione, 1,4 - diphenyl - 1,3 - butanedione, 1-phenyl-2-benzyl-1,3-butanedione, 1-phenyl - 3 - benzyl-9,11-nonadecanedione, 8,10-heptadecanedione, 8-ethyl-7,9-heptadecanedione, 6 - octyl - 5,7 - undecanedione, 4-phenyl-3,5-heptanedione, 1,3-cyclohexanedione, ethyl acetoacetate, methyl acetoacetate, n-propyl acetoacetate, isopropyl acetoacetate, tert-butyl acetoacetate, diethyl malonate, dimethyl malonate, di-n-propyl malonate, diisopropyl malonate, di-tert-butylmalonate, octyl acetoacetate, heptyl acetoacetate, phenyl acetoacetate, diphenyl malonate, dicyclohexyl malonate, dicyclohexyl octyl-malonate, dihexyl phenylmalonate, ethyl 3-oxopentanoate, octyl-3-oxoundecanoate, methyl 3-oxo-4-phenylbutanoate, ethyl 3-oxo-5-phenylpentanoate, octyl 3-oxo-2-phenylundecanoate, octyl 3-oxo-2-octylundecanoate, cyclohexyl 3-oxo-6-cyclopentylhexanoate, and the like.

Of the various compounds represented by these formulas, acetylacetone and ethyl acetoacetate are preferred.

Certain adjuvants are also employable in conjunction with these diketones including the alkylene oxides which include in their molecular structure at least one oxirane group having the structure

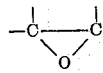

These compounds can be represented by the general formula:

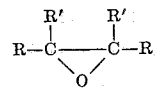

in which each R and each R' can be a hydrogen atom, an alkyl, cycloalkyl, or aryl group, or an epoxy-containing cyclic or alicyclic hydrocarbon group; and in which the R groups can be joined to form a carbocyclic group.

Typical compounds of this type include: exopyethane, 1,2-epoxypropane, 1,2-epoxybutane, 2,3-epoxybutane, 1,2,3,4-diepoxybutane, 1,2,4,5-diepoxypentane, 1,2,4,5,7,8-triepoxyoctane, 2,3-epoxy-2,3-dimethylbutane, 2,3-epoxy-2-methyl-3-ethylpentane, epoxyethylbenzene, epoxyethyl-cyclohexane, epoxyethyl - 3,4 - epoxycyclohexane, 1,2-epoxycyclohexane, 2,3-epoxyethylcyclohexane, 1,2-epoxy-cyclopentane, and the like.

The amount of dicarbonyl compound used will be from 1 to 5 gram mols per gram atom of total metal in the catalyst charged. The amount of alkylene oxide used will be sufficient to provide from 1 to 5 gram moles of oxide per gram atom of halogen in the catalyst charged. The chelator and adjuvant can be introduced directly by themselves into the contact zone, or they can be added separately, or in combination in solution in an inert hydrocarbon.

The catalyst residue which is being removed by the above extractant is readily defined as the residue from a catalyst system employed in the polymerization of the hereinbefore described olefins and contain a Group I, Group II, Group III, Group IV, Group V, Group VI or Group VIII (Mendelyeev Periodic System) metal or metal compound. The diketones are particularly applicable to the reduction of metal content and total ash of a system employing as part of its essential components a transition metal compound, for example, titanium, particularly those compounds with a transition metal compound which has a valence less than maximum.

The invention is particularly suitable when the polymer has been treated with a diketone for the removal of a metal halide component of the catalyst system which is a halide such as a trihalide of a Group IVA metal, that is, titanium, zirconium, and hafnium. However, it is to be understood that the invention is effective when the metals include vanadium, molybdenum, tungsten, cobalt and iron and the halides include trichlorides, trifluorides tribromides, triiodides, as well as the tetrachlorides, tetrafluorides, tetrabromides, and tetraiodides of the various metals, either individually or as mixtures of two or more of the metal halides. A frequently employed trichloride is titanium trichloride.

Polymers frequently employing the diketones to remove the catalyst residues are prepared in the presence of a catalyst system prepared by admixing at least two essential components, one of said components (a) being a metal compound selected from the group consisting of IV–A, V–A, VI and VIII metal compounds and another of said components (b) being selected from the group consisting of organometal compounds, metal hydrides and metals of Groups I, II, and III. A large variety of organometal compounds have been employed in conjunction with the transition metal compound and the invention is not limited in the metal compound.

A particularly suitable catalyst system for the preparation of high modulus polypropylene comprises a dialkyl aluminum halide, more preferably a dialkyl aluminum chloride, for example $(C_2H_5)_2AlCl$, and titanium trichloride, preferably having the approximate formula $3TiCl_3 \cdot AlCl_3$, the latter being suitably prepared by reaction of titanium tetrachloride and aluminum. The reaction is usually carried out at an elevated temperature, for example, at a temperature in the range of 360 to 600° F., preferably from 375 to 450° F.

It has now been found that when these thus-prepared and treated polymers are extruded at elevated temperatures to form a film or filament that said film or filament contains voids or bubbles which are detrimental to the product. This extrusion is generally conducted at a temperature above the softening point of polymer and below the decomposition point of the polymer, for example at a temperature in the range 400 to 600° F. The invention is generally applicable to the preparation of any thin structure such as film or filament and is particularly applicable to those films or filaments having a diameter or thickness of 1 to 10 mils. Extrusion may be effected in any conventional equipment. In one suitable form, in the production of film, the extruder is fitted with a slot die and a chill roll assembly is disposed a short distance therefrom.

By operating in accordance with the method of this invention, the solvent, if employed, is vaporized prior to or during extrusion leaving the phosphite ester intimately associated with the polymer.

The invention is best illustrated by the following example.

*Specific example*

Polypropylene is prepared by mass polymerization of propylene in the presence of a catalyst system comprising diethylaluminum chloride and the reaction product of titanium tetrachloride and aluminum having the approximate formula $3TiCl_3 \cdot AlCl_3$. Subsequent to the polymerization, the polymer, containing about 325 p.p.m. of titanium residues, is treated with acetylacetone in an amount of 2.0 stoichiometric equivalents based on titanium, the treating step being conducted in the presence of 2.0 stoichiometric equivalents of propylene oxide as a hydrogen chloride scavenger. The recovered polypropylene so treated has about 8 p.p.m. residual titanium.

A portion of this polymer was sprayed with an acetone solution containing equal amounts of dioctyl phosphite, 2,6-di-t-butyl-4-methylphenol, and dilaurylthiodipropionate, the two latter ingredients comprising the antioxidant system. The amount of solution used was sufficient to provide a concentration of 0.1 percent based on the polymer of each additive. After evaporation of the acetone solvent the polymer was extruded at 550° F. into film 3 mils in thickness using a slot die and conventional chill roll equipment. Based on a scale of 0 (no voids) to 10 (extreme voids) the rating of the film for voids was 1+. As a control, a second portion of the polypropylene was treated with an acetone solution of the antioxidant alone (no phosphite ester used). Film fabricated from this polymer at 550° F. had a rating of 5 (numerous voids in streaks and patches).

The foregoing runs demonstrate that the problem of void formation in films fabricated from a diketone treated polypropylene is eliminated by treatment with a phosphite ester.

While certain examples, structures, compositions and process steps have been described for purposes of illustration, the invention is not limited to these. Variation and modification within the scope of the disclosure and the claims can readily be effected by those skilled in the art.

We claim:

1. A process for the preparation of a substantially void free structure from a polymer of a mono-1-olefin which has been treated with a diketone to extract catalyst residue, said diketone having the structural formula

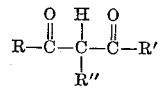

wherein R and R′ are selected from the group consisting of alkyl, cycloalkyl, aryl, aralkyl, alkaryl, alkylcycloalkyl, cycloalkylalkyl, alkoxy, cycloalkoxy, aroxy, aralkoxy, alkaroxy, alkylcycloalkoxy and cycloalkylalkoxy groups and R″ is hydrogen or a hydrocarbon group as defined for R and R′ and the number of carbon atoms in each of R, R′ and R″ being up to 8, comprising intimately admixing said polymer with a phosphite ester represented by the formula

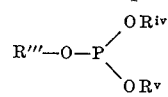

wherein R‴ is a hydrocarbon group selected from the group consisting of alkyl, aryl, cycloalkyl, alkaryl and aralkyl groups having 1 to 20 carbon atoms and $R^{iv}$ and $R^v$ are selected from the group consisting of R‴ and hydrogen, extruding said polymer at a temperature above its softening point to form said structure and solidifying said structure.

2. The process of claim 1 wherein said phosphite ester comprises dioctyl phosphite.

3. The process of claim 1 wherein said polymer is also treated with a phenolic antioxidant prior to extrusion.

4. The process of claim 1 wherein said polymer comprises polypropylene.

5. The process of claim 1 wherein said structure is a filament.

6. A process for the preparation of a substantially void free film of a polymer of a mono-1-olefin prepared by polymerizing at least one mono-1-olefin having 2 to 8 carbon atoms per molecule in the presence of a catalyst prepared by admixing at least two essential components, one of said components being (a) a metal compound selected from the group consisting of Groups IV–A, V–A, VI–A and VIII metal compounds, and another of said components (b) being selected from the group consisting of an organometal compound, metal hydride and metals of Groups I, II and III, said polymer subsequently being treated with a diketone to extract catalyst residue, said diketone having the structural formula

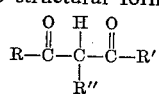

wherein R and R′ are selected from the group consisting of alkyl, cycloalkyl, aryl, aralkyl, alkaryl, alkylcycloalkyl, cycloalkylalkyl, alkoxy, cycloalkoxy, aroxy, aralkoxy, alkaroxy, alkylcycloalkoxy and cycloalkylalkoxy groups and R″ is hydrogen or a hydrocarbon group as defined for R and R′ and the number of carbon atoms in each of R, R′ and R″ being up to 8, comprising intimately admixing said polymer with a phosphite ester represented by the formula

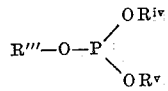

wherein R‴ is a hydrocarbon group selected from the group consisting of alkyl, aryl, cycloalkyl, alkaryl and aralkyl groups having 1 to 20 carbon atoms and $R^{iv}$ and $R^{v}$ are selected from the group consisting of R‴ and hydrogen, extruding said polymer at a temperature above its softening point to form a film and solidifying said film.

7. The process of claim 6 wherein said polymer is also treated with a phenolic antioxidant prior to extrusion.

8. The process of claim 6 wherein said phosphite ester is added to the polymer in an amount in the range of 0.025 to 1.0 parts by weight per hundred parts of polymer.

9. A process for the preparation of a substantially void free film of polypropylene prepared by polymerizing propylene in the presence of a catalyst system prepared by admixing diethylaluminum chloride and the reaction product of titanium tetrachloride and aluminum having the approximate formula $3TiCl_3 \cdot AlCl_3$, said polymer subsequently being treated with acetylacetone to extract catalyst residue, comprising applying an acetone solution containing from about 0.025 to 1.0 parts by weight per hundred parts of polymer each of dioctyl phosphite, 2,6-di-t-butyl-4-methyl phenol and dilaurylthiodipropionate onto said polymer in finely divided particulate form, extruding said thus treated polymer at a temperature of about 400 to 600° F. to provide a substantially void free film having a thickness of about 1 to about 10 mils and chilling said film.

References Cited

UNITED STATES PATENTS

| | | | |
|---|---|---|---|
| 2,860,115 | 11/1958 | Hecker et al. | 260—45.7 X |
| 3,149,093 | 9/1964 | Hecker et al. | 260—45.7 X |
| 3,219,622 | 11/1965 | Luciani et al. | 260—45.95 |

FOREIGN PATENTS

| | | |
|---|---|---|
| 604,245 | 12/1961 | Belgium. |
| 887,316 | 1/1962 | Great Britain. |
| 945,441 | 12/1963 | Great Britain. |

OTHER REFERENCES

Derwent: Belgian Patent Report, vol. 83A, pp. C58–C59, January–June 1962.

DONALD E. CZAJA, *Primary Examiner.*

LEON J. BERCOVITZ, *Examiner.*

M. J. WELSH, *Assistant Examiner.*